United States Patent [19]
Thompson

[11] Patent Number: 5,307,585
[45] Date of Patent: May 3, 1994

[54] FISHING ROD HOLDER

[76] Inventor: David M. Thompson, 802 Mantoloking Rd., Brick Town, N.J. 08723

[21] Appl. No.: 962,848

[22] Filed: Oct. 19, 1992

[51] Int. Cl.⁵ .................................................. A01K 97/10
[52] U.S. Cl. .................................... 43/21.2; 211/70.7; 211/70.8; 248/314
[58] Field of Search ................. 43/21.2; 248/512, 121, 248/314; 211/70.6, 70.8, 70.7, 60.1, 69.5, 89; 224/922

[56] References Cited

U.S. PATENT DOCUMENTS

| | | | |
|---|---|---|---|
| 2,580,625 | 1/1952 | Waltz | 43/21.2 |
| 2,613,000 | 10/1952 | Moore | 248/314 |
| 2,721,680 | 10/1955 | Steckmann | 43/21.2 |
| 2,956,687 | 10/1960 | Robichaud | 248/314 |
| 3,365,761 | 1/1968 | Kalvig | 248/314 |
| 3,487,947 | 1/1970 | Boggar, Jr. | 211/89 |
| 3,516,111 | 6/1970 | Heyman | 248/314 |
| 3,603,551 | 9/1971 | Peterson | 248/314 |
| 4,856,221 | 8/1989 | Thompson | 43/21.2 |

Primary Examiner—Kurt C. Rowan

[57] ABSTRACT

At least two rod-holding units are mounted on a substantially vertical, elongated flat surface. Each of the units has a mounting flange that holds a bracket in a vertical plane, normal to the flat surface. Each of the brackets has a central opening within which a diaphragm of flexible material is secured. The flexible material is cut into a series of wedges between a centrally-located hole and the central opening of the bracket. The wedges are intended to flex in either direction to accomodate any portion of a rod, and hold it. Each of the wedges has a series of lateral ridges, to grip the adjacent portions of the rod, and hollows molded into the flexible material, between the centrally-located hole and the central openings, to increase the flexibility of the outer portions of the wedges. Each of the brackets has an opening in its upper, outer quadrant, and each of the diaphragms has a corresponding opening, large enough to admit the adjacent portion of the rod, which can be seated, in a single motion, quickly and firmly, at the centers of the diaphrams.

7 Claims, 1 Drawing Sheet

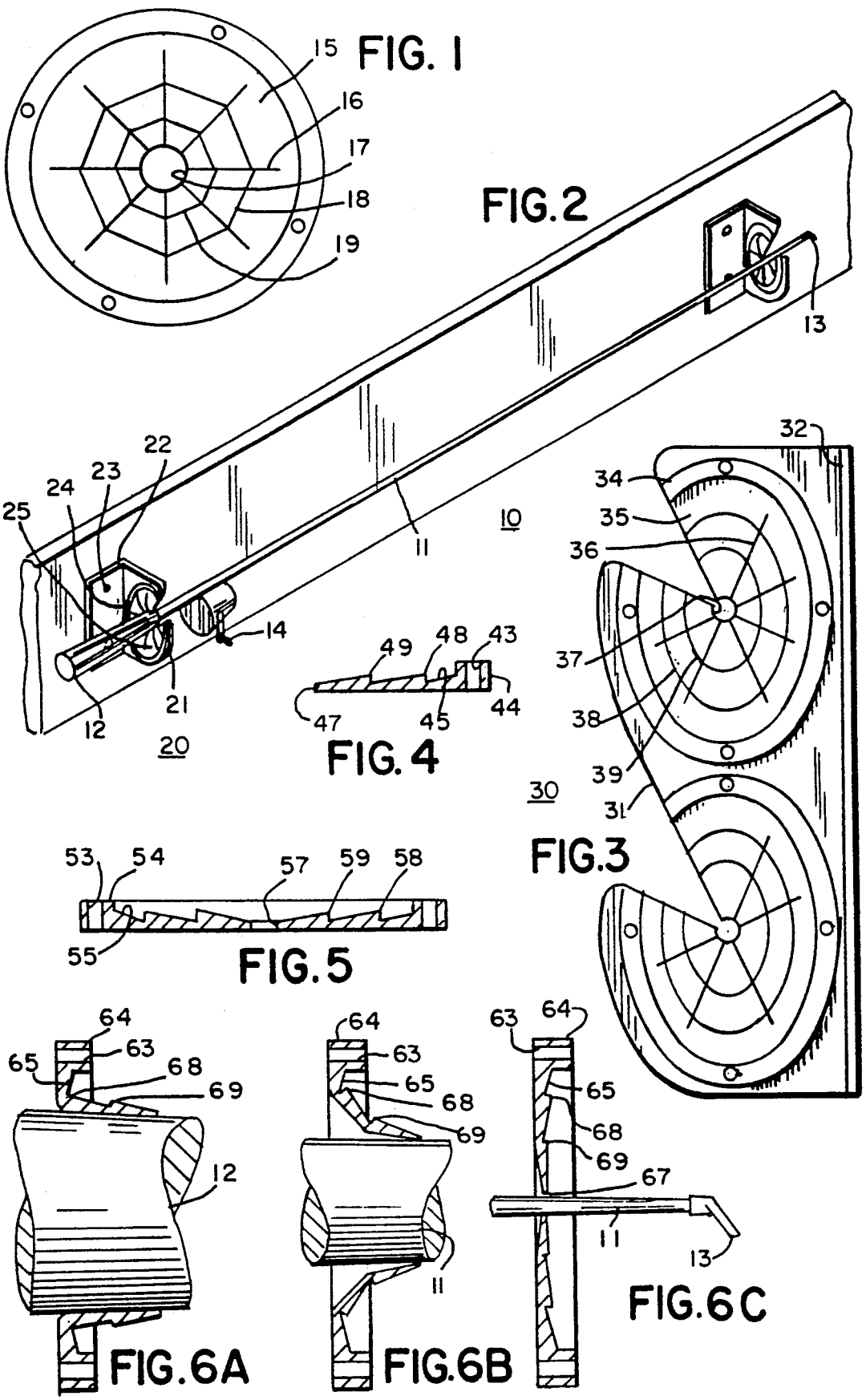

FISHING ROD HOLDER

BACKGROUND OF THE INVENTION

This invention is an improvement over my earlier invention covered in the U.S. Pat. No. 4,856,221 issued Aug. 15, 1989 for a Fishing Rod Holder.

As stated in the earlier application, fishing is a very serious sport and pastime for very many people, and, as in almost all other sports, it requires certain gear. For the typical fisherman, this usually means some form of fishing pole, not to mention an almost endless array of reels, lines, lures, floats, sinkers, etc.

Considering the poles, they must be as light as possible while still being strong enough to bring in the fish one is trying to catch. They must also be flexible and resilient enough to bend when the fish begins to tug and try to get off the hook. In other words, an ideal fishing rod must have every special characteristics, and a fishing rod with the ideal combination of lightness, strength, and flexibility can be a work or art, and quite expensive.

On the other hand, in achieving its maximum effectiveness for its prime purpose, it becomes very delicate physically for any other purpose. It is not designed for and cannot take other stresses. It cannot be stepped on or hit with a hard object, or even roughly handled without potential damage. A fishing pole is no more suitable for use as a bat as a bat would be for a fishing pole.

Fishing rods are also awkward to handle when not actually in use. They are long and spindly, and hard to grasp anywhere but their handle. They can be stored at home safely enough, but when they must be carried to and from the fishing grounds they can be cumbersome and very-much in the way. It is hard to find a place for them and they usually end up lying around where other gear may be dropped on them or they may be stepped on and broken or damaged.

This situation is magnified in a fishing boat to or from fishing grounds in a potentially heavy sea where fisherman and their gear may be bouncing around the boat.

This situation is very-much alleviated by the use of the special brackets for a fishing pole taught in my earlier patent that will hold the pole in a fixed position, out of the way of other gear in a boat. This device is easily accessible, and permits the pole to be stored or removed for use in a very short time. It also holds the fishing pole firmly under rough conditions but will cushion it against shock from any source.

However, it is still somewhat difficult to mount the fishing pole within its cushioned mountings, particularly in a seaway or other awkward conditions. For one thing, one end of the pole must be aligned with the opening in the diaphragm of one of the brackets and pushed through that diaphragm far enough for the other end to be pushed back through the other diaphragm; again, after alignment with the other diaphragm opening.

A further limitation of the necessity of inserting each end of a pole through an opening, in succession, is that only two end-access brackets can be used, and there are many situations where longer, or heavier, poles may need three or more brackets for secure mounting under rough conditions.

Another limitation is in that the radial cut sections of the flexible diaphragm become increasingly resistant to larger diameter objects. This is quite a factor with a fishing pole, where the tip is only a fraction of an inch, but the handle may be ten or twenty times the diameter of the tip. The increasing resistance of the diaphragm to the handle is an obstacle in the use of the basic device.

It is therefore an object of this invention to provide an improved, and simplified, safe mounting for fishing poles under rough conditions.

It is a further object of this invention to provide additional side openings in the upper quadrant of each of the brackets, so that both ends of the fishing rods can be dropped into several brackets quickly and easily and simultaneously.

It is a further object of this invention to provide an improved mounting for fishing poles that can more readily and easily accomodate radical differences in diameters at the ends of the poles.

It is a further object of this invention to provide a simple mounting for the ends of a fishing pole wherein the problem of resistance to larger diameters can be reduced by changes in the thickness of the diaphragm along the radial cut sections to make it almost as easy to fit in the handle as it is to fit in the tip of the rod.

It is a further object of this improvement to provide a simpler, more effective holder for either end of a fishing pole that is more compact, that is more adaptable to varying sizes of poles, and that provides gradations of pressure on the varying thicknesses of the poles.

It is a further object of this invention to provide a mounting and holder for a fishing pole that permits the pole to be fitted into the holders, easily and quickly, from the side without having to thread the pole in from either end; all this while still retaining the firm yet cushioned support for the fishing pole under adverse conditions.

SUMMARY OF THE INVENTION

A device for holding slender, delicate, elongated objects, such as fishing poles or the like has at least two units mounted along a given surface. Each unit has a central portion, or diaphragm mounted in an opening in a bracket supporting it away from the given surface. The central portion is formed of a resilient and flexible material, and has a small central opening with radial cuts extending from the central opening to the edges of the opening in the bracket forming wedge-shaped sectors. These sectors have deep transverse depressions in the flexible material at intervals along the sectors to make the sectors more flexible at each interval, and even along the outer edges, as well as at the inner edges. In addition to the improved flexibility or the diaphragm, openings are provided in the upper, outer quadrant of the brackets, and in the corresponding sectors of the diaphragms to permit the rod or pole to be put into all of the brackets, in a single motion, simultaneously, to fit into the centers of the flexible diaphragm to be held securely until removed.

BRIEF DESCRIPTION OF THE DRAWINGS

FIG. 1 shows a plan view of the basic diaphragm with depressions at intervals in the radial slots;

FIG. 2 shows an isometric view of the modified brackets holding a fishing pole;

FIG. 3 shows a side view of double brackets for holding two poles;

FIG. 4 shows a cross section of a part of a sector;

FIG. 5 shows a cross section of a typical diaphragm;

FIG. 6A shows the diaphragm flexed for a maximum load;

FIG. 6B shows the diaphragm flexed for a medium load; and

FIG. 6C shows the diaphragm flexed for a minimum load

DETAILED DESCRIPTION OF THE DRAWINGS

Referring now more particularly to FIG. 1, a plan view of a typical flexible diaphragm 15 is shown. This is similar to the units seen in the above-mentioned "FISHING ROD HOLDER" of the earlier patent with the concept of radial cuts 16, from a center hole 17. However, this has the addition of transverse ridges and depressions 18 and 19 in the radial cut sectors or sections to provide increased flexibility in the diaphragm from its inner to its outer edge.

Actually, while this is an improved circular unit that could be applied to the earlier rod holder, it can also have openings, similar to those shown in FIGS. 2 and 3, by suitable cuts through the bracket and the upper, outer quadrant of the flexible material of the diaphragm. This will permit the rods to be fit in from the sides, instead of through the ends. This will provide the simpler and quicker loading, along with the improved flexibility along the radial cut sections, as will be described later.

FIG. 2 shows an isometric view of an entire unit, mounted on the surface of a bulkhead, or the like, 10. This may be on a ship, and can be on the inside or the outside of a cabin. Actually, a place should be chosen where the fishing rod 11 will be off the deck, out of the way, and as safe as possible from accidental damage.

The actual fishing rod holder has at least two units, or brackets, such as 21 that are mounted slightly less than the length of a rod apart, and secured to the mounting surface 10. The units are similar, if not identical.

However, the brackets and diaphragms must be of a size and flexibility to accomodate the handle as well as the tip of a standard fishing rod or pole. There are many sizes and weights of rods for different types of fishing, so, obviously, in spite of the flexibility of this unit, larger and smaller units are forseeable, and may be provided for special situations.

While the basic brackets may be designed to accomodate a circular diaphragm, as seen in FIG. 1, these units are more of an oval shape, to be flatter against the supporting surface.

Of more interest, the FIG. 2 shows the openings, or access slots—as will be seen more clearly in FIG. 3—for dropping or inserting the fishing rod in from the side. These units are holding a typical fishing rod or pole 11, that has a handle 12 on one end; a tip 13 on the other end; and a reel 14 near the handle.

The unit 20, for example, has a projecting portion or bracket 21 that secured to, or is part of a flange 22 with holes for suitable fasteners 23. The projecting portion 21 has a rim 24 that forms an opening that contains a flexible diaphragm 25 with radial cuts that form the sectors that actually hold the handle 12, as well as the tip 13, of the fishing rod. These elements will be more clearly illustrated in the remaining drawings.

FIG. 3 shows a side view of a variation of the this invention. Here the unit 30 has a bracket 31 that is designed to hold two separate fishing rods. This also shows, slightly enlarged and more clearly, that the bracket has a flange 32 to mount on a suitable surface. A rim 34 may include holes to secure the diaphragm 35 within the bracket 31. The diaphragms, and their functions, are seen more clearly in FIGS. 4 to 6. Radial cuts 36 form the sectors extending outward from the center 37, that have the grooves or ridges and hollows 38 and 39 that give the unit its improved flexibility.

While a two unit bracket is shown, there could be more units in a given bracket to accomodate additional rods, but that would depend on the location, the available space and the need for more storage of rods. On the other hand, this could be a single unit bracket, as shown in FIG. 2.

FIG. 4 shows a cross section of a side view of a portion of a flexible diaphragm, at nearly full size. The mounting ring 44 has fastener holes 43, and shows the ridges 48 and 49 at the points of increased flexibility to accomodate more easily various sizes of rod portions, as will be seen in the subsequent figures.

The ridges and hollows, shown here and in the other figures, are molded into one side of the diaphragm, but is should be obvious to anyone skilled in the art that they could be on either or both sides of the diaphragm and of more or less numbers and a variations of configurations that would provide ridges and hollows for improved flexibility. The saw-tooth configuration shown here provides deep, well-defined hollows for ease of bending, as well as high ridges to grip the rod.

FIG. 5 is a cross section of a complete unit, or diaphragm, with, again, fastening holes 53 through mounting ring 54 around the flexible diaphragm 55. The center opening 57 leads radially to the outer and inner ridges 58 and 59 where the diaphragm has been cut down to be more flexible. The deeper the cuts, or the thinner the hollows in the diaphragm across the sectors, the more the flexibility of the outer edges of the unit.

The FIGS. 6A, 6B, & 6C show side view cross sections of a unit, similar to those of FIGS. 3 and 5, with a typical range of possible elements to be accommodated, with similar elements similarly numbered. In FIG. 6A, a hole 63 is provided in a mounting rim or ring 64 of a flexible diaphragm 65 for securing it to a bracket, as shown in FIG. 2 and 3. This mounting ring is secure while the fishing rod handle 12 flexes the diaphragm at depression 68 to accomodate its large diameter.

In FIG. 6B, which is the same unit as in FIG. 6A, and is similarly numbered, a smaller diameter unit of the rod 11 is accomodated, and the diaphragm is bent at 69, as well as at 68.

In FIG. 6C, which is, again, the same unit as in FIGS. 6A and 6B, and is similarly numbered, the smallest part of the rod 11, next to the tip 13, is accomodated with only a token flexing of the diaphragm at the opening 67.

The flanges, seen in FIGS. 2 and 3, as well as the bracket itself, can certainly be of metal, stamped for the necessary holes, and bent into shape. The unit may also be of heavy plastic—that can be formed into any desired shape, nicely rounded, and moulded in quantities—or of wood.

Since fishing poles and the like come in all sorts of sizes and shapes, the sizes of the units, as noted, can obviously be varied, and used in any combination to accomodate any of the innumerable sizes and shapes of fishing poles. As noted, the shapes of the openings 24 and 34, as well as the central openings or holes 27 and 37, may be varied to accomodate special shapes of rods or handles.

Other elongated gear, such as boat hooks, small poles, and even oars, may also be accomodated by providing brackets of suitable size and strength. Here, again, with the side mounting provided here, one or mor additional brackets can be provided to carry additional weight and accomodate longer units.

Movable, temporary fastenings, not shown, would be an obvious variation, and can also be provided in any manner, with snaps or "velcro" fasteners, for example, to change the spacing or the types of the units.

I claim:

1. A fishing pole holder comprising at least two brackets mounted on a relatively flat surface, the spacing between the outermost of said brackets being less than the length of said fishing pole; each of said brackets having a flange portion; means for mounting said flange portions on said relatively flat surface; each of said flange portions supporting a bracket portion extending at right angles away from said flat surface; each of said bracket portions having a central opening; each of said central openings supporting a diaphragm of a resilient material with a centrally-located hole and radial cuts from said centrally-located hole to the edges of said central openings; said radial cuts defining wedge-shaped sections; the thickness of each of said wedge-shaped sections increasing and having a series of lateral ridges and hollows spaced between said hole and said edges of said central opening, said hollows varying thickness making said resilient material of said wedge-shaped sections more flexible, even to said edges of said central openings; said ridges, of increasing thickness, gripping the adjacent portions of said fishing pole; and openings in the upper quadrants of said brackets and of said diaphragms of resilient material to permit the lateral introduction of any portions of said fishing pole, to be seated at the centers of said diaphragms.

2. A fishing pole holder, as in claim 1, wherein all of said brackets are perpendicular to the axis of said fishing pole, and said centrally-located holes of all of said diaphragms of resilient material are in alignment to hold an elongated fishing pole.

3. A fishing pole holder, as in claim 1, wherein said ridges and hollows are formed by a series of saw-toothed configurations perpendicular to the axis of each of said wedge-shaped sections.

4. A fishing pole holder, as in claim 1, wherein said centrally-located opening in each of said diaphragms of resilient material is the size of the tip of said fishing pole, and said hollows adjacent to said edges of said central openings form the size of the handle of said fishing pole.

5. A fishing pole holder, as in claim 1, wherein said brackets have two or more openings, one above the other supporting as many diaphragms of resilient material with their centrally-located holes in alignment to accomodate as many fishing poles.

6. A fishing pole holder, as in claim 1, wherein said central openings in said brackets are circular, and said diaphragms of resilient material are also circular.

7. A fishing rod holder, as in claim 1, wherein said central openings in said brackets are oval, and said diaphragms of resilient material are also oval.

* * * * *